Figure 1:
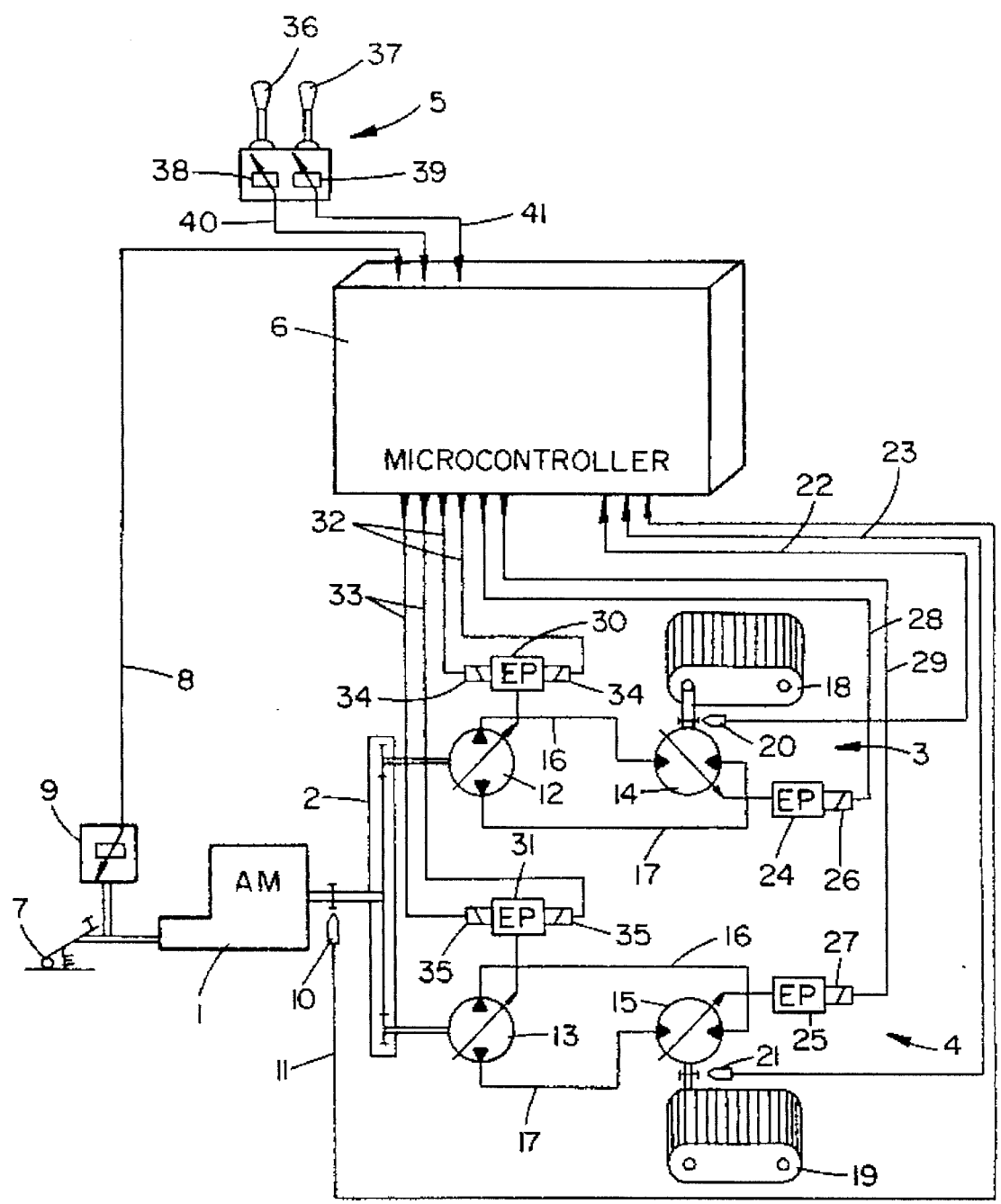

United States Patent
Leibing et al.

[11] Patent Number: 5,542,251
[45] Date of Patent: Aug. 6, 1996

[54] CONTROL AND REGULATION DEVICE FOR A VEHICLE TRAVEL DRIVE

[75] Inventors: Karl-Heinz Leibing, Gerstetten-Dettingen; Kai-Uwe Hansen, Biberach; Reinhard Vonnoe, Wissenhorn, all of Germany

[73] Assignee: Brueninghaus Hyodromatik GmbH, Elchingen, Germany

[21] Appl. No.: 343,516

[22] PCT Filed: Jul. 12, 1993

[86] PCT No.: PCT/EP93/01821

§ 371 Date: Dec. 5, 1994

§ 102(e) Date: Dec. 5, 1994

[87] PCT Pub. No.: WO94/02346

PCT Pub. Date: Feb. 3, 1994

[30] Foreign Application Priority Data

Jul. 23, 1992 [DE] Germany ............ 42 24 359.9

[51] Int. Cl.⁶ .................................................. F16D 31/02
[52] U.S. Cl. ............................... 60/426; 60/446; 60/448; 60/492
[58] Field of Search ............. 91/361, 459; 60/420, 60/421, 426, 427, 443, 445, 446, 448, 487, 490, 491, 492

[56] References Cited

U.S. PATENT DOCUMENTS

| | | | |
|---|---|---|---|
| 4,175,628 | 11/1979 | Cornell et al. ............ | 180/6.48 |
| 4,368,798 | 1/1983 | Meyerle et al. ............ | 60/448 X |
| 4,679,396 | 7/1987 | Heggie ............ | 60/490 X |
| 5,029,067 | 7/1991 | Nisaida et al. ............ | 60/421 X |
| 5,077,973 | 1/1992 | Suzuki et al. ............ | 60/428 |
| 5,137,100 | 8/1992 | Scott et al. ............ | 60/428 X |
| 5,168,704 | 12/1992 | Kast et al. ............ | 60/428 X |
| 5,249,422 | 1/1993 | Smith et al. ............ | 60/426 |

FOREIGN PATENT DOCUMENTS

| | | |
|---|---|---|
| 0151207 | 8/1985 | European Pat. Off. . |
| 2053092 | 5/1972 | Germany . |
| 2537073 | 8/1990 | Germany . |

*Primary Examiner*—Hoang Nguyen
*Attorney, Agent, or Firm*—Scully, Scott, Murphy & Presser

[57] ABSTRACT

A control and regulation device for a vehicle travel drive, which comprises two hydrostatic transmissions (3, 4) of adjustable transmission ratios, each comprising a hydraulic pump (12, 13) and a hydraulic motor (14, 15), which are in driving connection with two vehicle track arrangements (18, 19) and have each an adjustment device (30, 24; 31, 25) controllable with control signals ($v_l$, $v_r$) for adjusting the transmission ratio, with a control section comprising a desired-value setting apparatus (5) and a signal processing means (42, 43), whereby the desired-value setting means sets transmission ratio desired-values of each hydrostatic transmission, employing respective adjustable control levers (36, 37), and outputs desired-value signals ($s_l$, $s_r$), and the signal processing apparatus processes desired-value signals to control signals ($s_l$, $s_r$) and outputs the latter. For the avoidance of undesired travel speed alterations the signal processing (42, 43) is formed for the formation of a min./max. window from desired-value signals ($s_l$, $s_r$) for the determination of control signals ($v_l$, $v_r$) if the mean value of $v_l$ and $v_r$ lies within the min./max. window, and if not, corrects the control signals to be outputted.

14 Claims, 4 Drawing Sheets

1

CONTROL AND REGULATION DEVICE FOR A VEHICLE TRAVEL DRIVE

The invention relates to a control and regulation device for a vehicle travel drive in accordance with the preamble of claim 1.

From DE-PS 25 37 073 such a device is known, the desired-value setting means of which has three control levers, one of which serves for the setting of the speed of travel and each of the two others serves for the steering, through reduction of the transmission ratio of the respective hydrostatic transmission on the inside of a curve. This kind of steering has the disadvantage of the occurrence of undesired alterations of the speed of travel and thus of the power requirement of the drive motor, resulting in a deloading or loading thereof during cornering.

The known control and regulation device further comprises a constant running regulation means which serves for maintaining the respective set transmission ratios of the hydrostatic transmissions upon the occurrence of external disturbances. This constant running regulation means however only comes into effect during straight line travel, so that disturbances arising during cornering, as e.g. different loadings of the two hydrostatic transmissions, lead to undesired changes of the steering radius and the speed of travel. Further, the known control and regulation device has a limit load regulation means which is connected upstream of the constant running regulation means and thus acts upon the adjustment devices of the two hydrostatic transmissions by means of alterations of the control signals. As in general for reasons of stability a relatively slow control behaviour is set in the constant running regulation means, dynamic overloading of the drive motor or even a decelerating thereof to the point of standstill may be the consequence.

It is the object of the invention to further develop a control and regulation device of the kind mentioned in the introduction in such a way that undesired alterations of the speed of travel are hindered.

This object is achieved through the characterising features of claim 1. After formation of the min./max. window from desired values of the transmission ratios of the hydrostatic transmissions, set by means of the control levers, the control and regulation device according to the invention determines whether the previous speed of travel is to be maintained or altered, through comparison of the mean value—corresponding to the speed of travel—of the control signals output before the formation of the min./max. window with the minimum value and the maximum value of the min./max. window. In the first case, which arises if the mean value of the control signals output before the formation of the minimum/maximum window lies within the min./max. window, the control signals to be output are determined through addition or subtraction of the difference of the desired-value signals to or from the mean value of the control signals output before the formation of the minimum/maximum window. In the latter case, which arises if the mean value of the control signals output before the forming of the min./max. window lies outside the min./max. window, the control signals output before the forming of the min./max. window are corrected through addition of the difference between the minimum value of the min./max. window and the mean value of the control signals output before the forming of the min./max. window for the purpose of increasing the speed of travel, or through subtraction of the difference between the control signals output before the forming of the minimum/maximum window and the maximum value of the min./max. window for the purpose of reducing the speed of travel. In this way, on the one hand desired alterations of the speed of travel are made possible when travelling in a straight line and when also cornering, but on the other hand undesired alterations of the same are avoided and thereby the power requirement of the drive motor is at the same time kept largely constant or disturbing load variations of the same are hindered.

In practice, so-called one-lever control systems are known in which by means of a single control lever the speed of travel can be altered e.g. through forward or backward displacement thereof, and in which through a simultaneous lateral displacement of this control lever to the left or to the right cornering can be initiated, the selected speed of travel being maintained. However, this advantage of maintaining the speed of travel during cornering has the disadvantage that no individual control of the two drive sides can be effected. The so-called two lever control systems, also known in the prior art, make possible individual control of the two drive sides, however they have the disadvantage that in practice it is almost impossible to maintain a constant speed of travel during the transition from travelling in a straight line to cornering.

The control and regulation device according to the invention also comprises a two-lever control, which however combines the advantages of the one-lever control, i.e. the maintenance of the speed of travel during the transition to cornering, with the advantages of the conventional two-lever control, namely the individual control of both drive sides and the visualisation of each travel situation, while avoiding the disadvantages of both conventional controls, and thus allows improved manoeuvrability, in particular with special-purpose vehicles, such as ski-run vehicles.

A further, possibly independent, measure towards the solution of the object underlying the invention, lies in the application of a constant running regulation means according to the characterising part of claim 10, which eliminates all disturbances which may cause a deviation of the transmission ratios of the hydrostatic transmissions from the set desired values, both when travelling in a straight line and when cornering, and at the same time, when using a limit load regulation means connected downstream in accordance with claim 11, allows it to act without temporal delay.

Further features and advantages of the invention are apparent from the remaining subsidiary claims.

Figure 2:
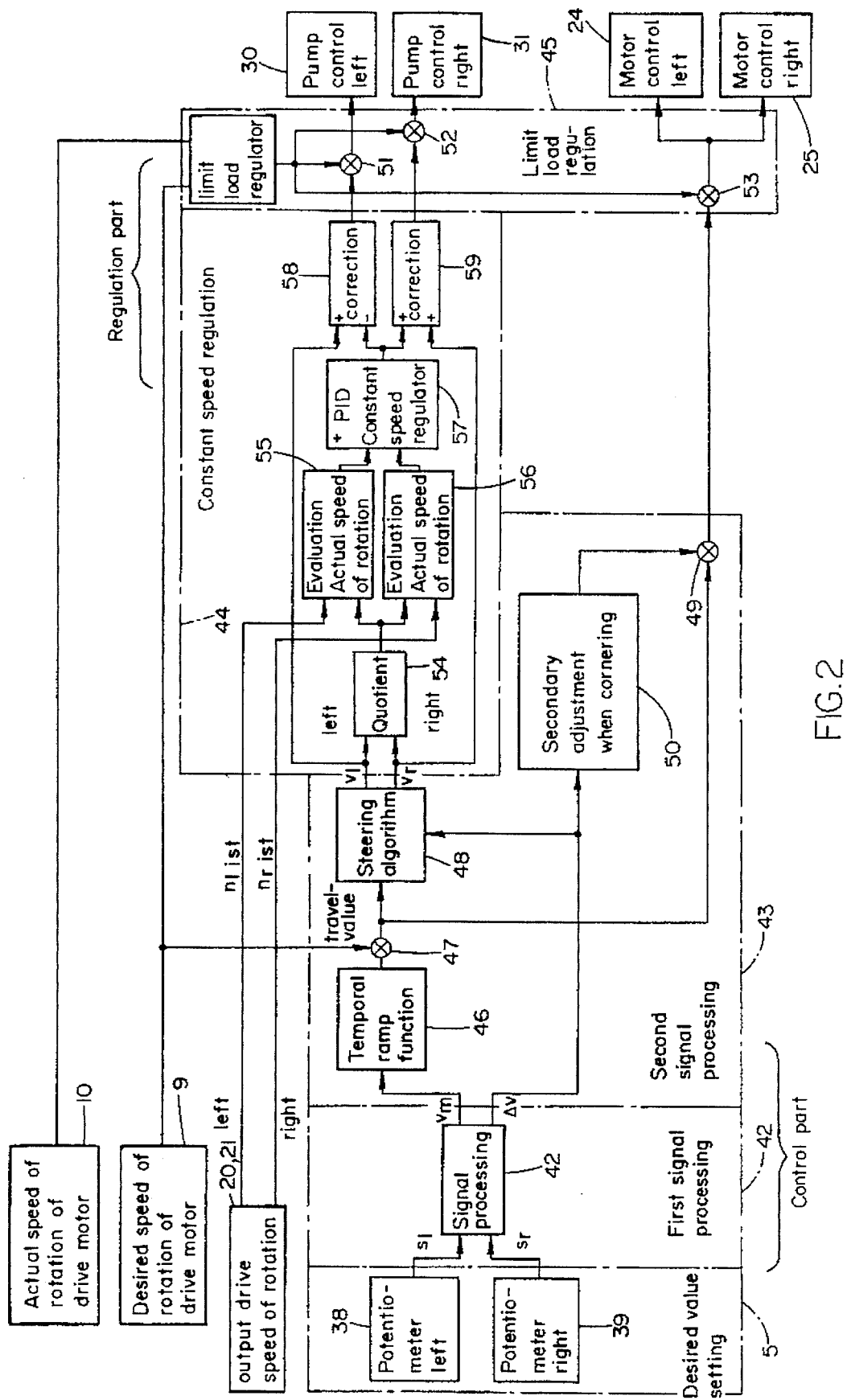

Below, the invention will be described in more detail with reference to a preferred embodiment and with reference to the drawings, which show:

FIG. 1 a vehicle travel drive with the control and regulation device in accordance with the preferred embodiment of the invention, in schematic representation, FIG. 2 a block schematic of the control and regulation device in accordance with FIG. 1, including a control part, and FIGS. 3 to 6 different positions of control levers of the control and regulation device in accordance with FIG. 1 and control signals derived therefrom by means of the control part in accordance with FIG. 2, in schematic representation.

The vehicle drive shown in FIG. 1 comprises a drive motor 1, a divider transmission 2, two hydrostatic transmissions 3, 4 and a control and regulation device with a desired-value setting means 5 and a programmable microcontroller 6. The drive motor 1 is a Diesel engine with adjustable speed of rotation and for this purpose a gas pedal 7 is provided for the setting of the desired speed of rotation. A potentiometer 9 connected to the microcontroller 6 by means of a control line 8 is provided for detecting the position of the gas pedal 7. A speed of rotation sensor 10, for detecting the actually occurring speed of rotation of the drive motor 1, is connected to the microcontroller 6 via a control line 11.

The hydrostatic transmissions 3, 4 comprise respective hydraulic pumps 12 and 13 which can be driven in parallel by the drive motor 1 via the divider transmission 2, and respective hydraulic motors 14 and 15 which are connected to the hydraulic pumps 12 and 13 via two working lines 16, 17 and are in driving connection with left and right track arrangements 18, 19 of the vehicle. Respective speed of rotation sensors 20, 21 for detecting the output drive speeds of rotation $n_{list}$, $n_{rist}$ of the hydraulic motors 14, 15 are connected with the microcontroller 6 via respective control lines 22 and 23. Both speed of rotation sensors 20, 21 work according to the Hall principle and can thus also detect lowest speeds of rotations.

The hydraulic pumps 12, 13 are reversible adjustable pumps and have two directions of flow just as do the hydraulic motors 14, 15 which are formed as adjustable motors. All hydraulic machines 12 to 15 are provided with respective adjustment devices for the purpose of adjusting their displacement volumes. Each of the displacement devices 24 and 25 associated with the hydraulic motors 14, 15 comprises an electrical proportional magnet 26 or 27, which is connected with the microcontroller 6 by means of a left or right control signal line 28, 29 and can be controlled by the microcontroller with control signals $v_l$ or $v_r$. These control signals $v_l$, $v_r$ are converted into hydraulic control pressures with a direct effect on the (not shown) adjustment cylinders of the respective hydraulic motors 14, 15. The adjustment devices 30, 31 for the hydraulic pumps 12 and 13 in principle correspond with the above-described control of the hydraulic motors 14, 15, but each comprises two proportional magnets 34 or 35—one for forward travel and one for reverse travel of the vehicle—which can be controlled via respective control signal lines 32 and 33 from the microcontroller 6 likewise by means of control signals $v_l$, $v_r$.

The desired-value setting means 5 comprises a left and a right control lever 36 and 37, both of which are adjustable, for the purpose of setting desired values of the transmission ratios of the left and right hydrostatic transmissions 3, 4, within a positive adjustment range +B (corresponding to forward travel of the vehicle) and within a negative adjustment range −B (corresponding to reverse travel of the vehicle). For detecting the respective adjustment movement of the control levers 36, 37—referenced to a zero line N separating the adjustment ranges +B and −B—and to generate corresponding desired-value signals $s_l$, $s_r$, respective potentiometers 38, 39 are provided that are connected to control logic "first signal processing means 42" of the microprocessor 6 by means of respective desired-value signal lines 40, 41. For the sake of simplicity the reference signs $s_l$, $s_r$ for the desired-value signals at the same time serve for designating the adjustment movements of the two control levers 36, 37. The working range of each potentiometer 38, 39 is subdivided into three respective areas, namely a smaller area for travel in a straight line for the safe reproducibility, one steering area for tighter curves with increasing potentiometer excursion until standstill of one of the two track arrangements 18, 19 and an area for track counter rotation which extends to the maximum position with counter-running tracks with equal driven speeds of rotation.

The first signal processing means 42 serves for processing the desired-value signals $s_l$, $s_r$ into the control signals $v_l$, $v_r$ and, together with control logic "second signal processing means 43", connected downstream in the microcontroller 6, for the further processing of the control signals $v_l$, $v_r$, and the desired-value setting means 5, represents the control part of the control and regulation device, the regulation part of which is arranged within the microcontroller 6 and comprises regulation logic "constant running regulation 44" and further regulation logic "limit load regulation 45".

The constant running regulation means 44 serves for the elimination of disturbances which might cause deviations of the transmission ratios of the hydrostatic transmissions 3, 4 from the values corresponding to the control signals $v_l$, $v_r$. The function of the limit load regulation means 45 is that of increasing the transmission ratios of the hydrostatic transmissions 3, 4 upon overloading of the drive motor 1.

With reference to FIG. 2, the function of the second signal processing means 43, the constant running regulation means 44 and the limit load regulation means 45 will now be described:

The first signal processing means 42 determines the control signals $v_l$, $v_r$ from the desired-value signals $s_l$, $s_r$, in a manner to be described below, and determines a control signal mean value $v_m=(v_l v_r)/2$ therefrom, which corresponds to the speed of travel of the vehicle with reference to the longitudinal middle axis thereof, and determines the difference $\Delta v$ of the two control signals $v_l$, $v_r$ as steering information. Both the signals $v_m$ and $\Delta v$ are output to the second signal processing means 43, in which the signal $v_m$ is delayed via a time ramp function 46, is subsequently modified at a multiplication point 47 by the desired speed of rotation signal of the drive motor 1, set by the gas pedal 7, and then supplied to a steering algorithm 48 on the one hand and, on the other hand, output to the adjustment devices 24, 25 of the hydraulic motors 14, 15 of the two hydrostatic transmissions 3, 4 via a multiplication point 49 and the limit load regulation means 45.

Within the second signal processing means 43, the steering information $\Delta v$ is reported undelayed to the control algorithm 48 and to the control logic circuit "secondary adjustment when cornering 50". The control algorithm 48 calculates the signals $\Delta v$ and $v_m$ back to the control signals $v_l$ and $v_r$, which are now supplied to the adjustment devices 30, 31 of the hydraulic pumps 12, 13 of the two hydrostatic transmissions 3, 4 via the constant running regulation means 44 and the limit load regulation means 45. When a predetermined value of the steering information $\Delta v$ is exceeded, the control logic circuit 50 acts upon the control of the adjustment devices 24, 25 of the hydraulic motors 14, 15 for the purpose of swinging them out in the direction of greater displacement volume by outputting a corresponding signal which correspondingly corrects the control signal mean value $v_m$ at the multiplication point 49.

When a predetermined overloading of the drive motor 1 is exceeded, which is detected by forming the difference of the desired speed of rotation set by the gas pedal 7 and the measured actual speed of rotation of the drive motor 1 determined by the speed of rotation sensor 10, the limit load regulation means 45 acts upon the control of the adjustment devices 30, 31 of the hydraulic pumps 12, 13 and also the adjustment devices 24, 25 of the hydraulic motors 14, 15 by outputting a corresponding signal that corrects, via respective multiplication points 51, 52, 53, the control signals $v_l$, $v_r$ or $v_m$ output from the constant running regulation means 44 and from the second signal processing means 43 via the multiplication point 49.

From the control signals $v_l$, $v_r$ output from the steering algorithm 48 of the first signal processing means 42, the quotient $v_l/v_r$ and its reciprocal value are formed in a quotient formation point 54 of the second signal processing means 43. This quotient and its reciprocal value are used in evaluation points 55, 56 for the evaluation of the output drive speeds of rotation $n_{list}$, $n_{rist}$ of the two hydraulic motors 14, 15 according to the following equations:

$$n_l = n_{list} \times v_r / v_l \text{ for right-hand curves, and}$$

$$n_r = n_{rist} \times v_l / v_r \text{ for left-hand curves.}$$

The output drive speeds of rotation $n_l$, $n_r$ of the two hydraulic motors 14, 15 evaluated in such a way should be equal to the measured actual values of the output drive speeds of rotation $n_{rist}$ or $n_{list}$ of the respective other hydraulic motor when travelling in a straight line and also when cornering. Correspondingly, in a PID constant running regulator 57 of the second signal processing means 43 the differences $\Delta n_l$ and $\Delta n_r$ are formed in accordance with the following equations:

$$\Delta n_l = n_l - n_{rist} \text{ for right-hand curves, and}$$

$$\Delta n_r = n_r - n_{list} \text{ for left-hand curves}$$

and are used when the value zero is exceeded at correction positions 58, 59 in the second signal processing means 43 for the correction of the control signals $v_l$, $v_r$ output from the steering algorithm 48. Thereby three different correction strategies can be followed, namely either deceleration of the hydraulic motor 14 or 15 with the higher output speed of rotation $n_{list}$ or $n_{rist}$ through swinging back of the associated hydraulic pump 12 or 13 in the direction of smaller displacement volume, acceleration of the hydraulic motor 14 or 15 with the smaller speed of rotation $n_{list}$ or $n_{rist}$ through swinging out of the associated hydraulic pump 12 or 13 in the direction of larger displacement volume, or a combination of both the above-mentioned correction strategies i.e. acceleration of the one and deceleration of the other hydraulic motor.

With reference to FIGS. 2 to 6 the function of the desired-value setting means 5 and the first signal processing means 42 will be described below:

At standstill of the vehicle the drive motor 1 runs at idling speed and the control levers 36, 37 are in their zero position, i.e. in a parallel position on the zero line N, so that no desired-value signals $s_l$, $s_r$ are generated and correspondingly the hydraulic pumps 12, 13 are set at minimum displacement volume and the hydraulic motors 14, 15 are set at maximum displacement volume. In order to set the vehicle into motion either forwards or backwards both an increase of the speed of rotation of the drive motor 1, by means of correspondingly adjusting the gas pedal 7, and a control lever 36, 37 adjustment—when travelling forwards, into the positive adjustment area +B, and when travelling backwards into the negative adjustment area −B—are necessary. The desired-value signals $s_l$, $s_r$ generated from the potentiometers 38, 39 in correspondence with the respective adjustment positions $s_l$, $s_r$ of the two control levers 36, 37 are supplied to the first signal processing means 42 and are there processed as follows:

In a first signal processing step there is effected a limitation of the desired-value signals $s_l$, $s_r$ to a highest value of approx. 90% of the maximum value of 100% which corresponds to the maximum adjustment movement of the control levers 36, 37 and which corresponds to the maximum transmission ratio of the hydrostatic transmissions 3, 4. In other words, the maximum speed of travel achievable at maximum adjustment of the control levers 36, 37 (100% adjustment movement), corresponding to the current speed of rotation of the drive motor 1, is already reached at about 90% of the transmission ratios. In this way a steering reserve LR of approx. 10% remains (see FIG. 3), upon the utilization of which the steering strategy yet to be described can be complied with up to a certain curve radius, and only with tighter curves and fully swung out or swung back hydraulic machines 12 to 15 is the speed of travel reduced.

Figure 6:
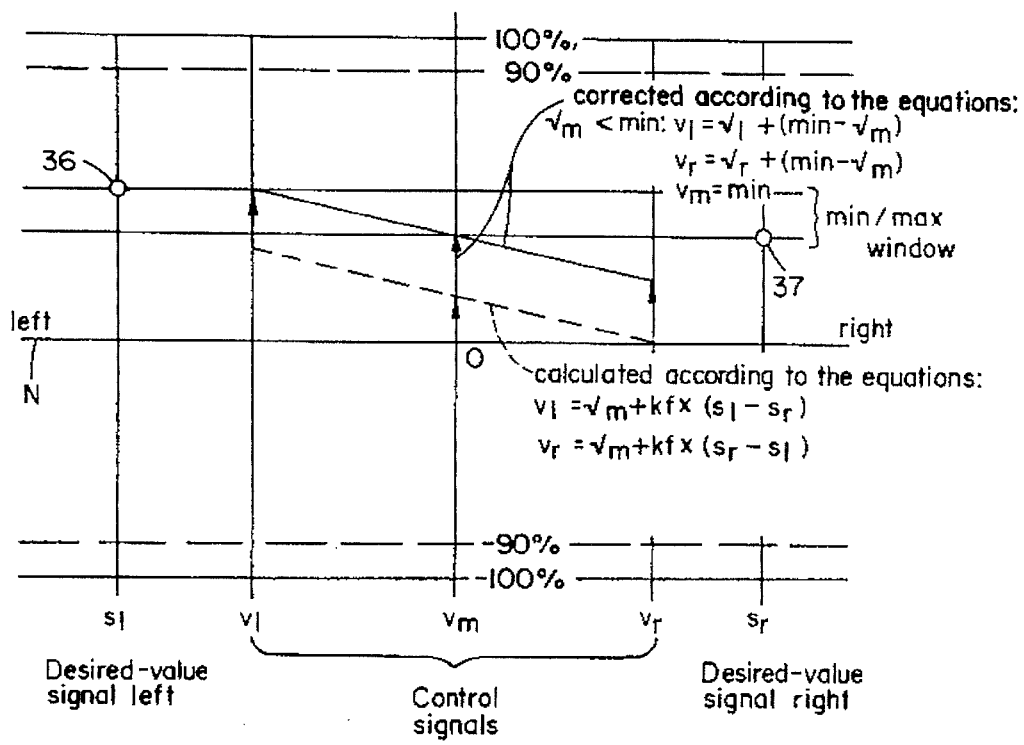

In the next signal processing step, a min./max. window is formed from the desired-value signals $s_l$, $s_r$, limited to 90%, in accordance with the, as as shown in FIG. 6, relationships:

$$\min. = \text{minimum } (s_l, s_r)$$

$$\max. = \text{maximum } (s_l, s_r)$$

the desired-value signal $s_l$ and $s_r$ with the respective lower value representing the minimum value and the desired-value signal $s_r$ or $s_l$ with the respective higher value representing the maximum value of the min./max. window.

As the mean value $v_m = (v_l + v_r)/2$ of the control signals $v_l$, $v_r$ determined in a preceding signal processing step equals zero, in correspondence with the standstill of the vehicle, and therefore lies outside the formed min./max. window, the control signals $v_l$, $v_r$ to be output are determined in accordance with the following equations:

$$v_m < \min.: v_l = v_l + (\min. - v_m)$$

$$v_r = v_r + (\min. - v_m)$$

$$v_m = \min.$$

Therefrom there result control signals $v_l$, $v_r$ of equal values and thus a swinging out of the hydraulic pumps 12, 13 to corresponding larger displacement volume and a simultaneous swinging back of the hydraulic motors 14, 15 to corresponding smaller displacement volume; the vehicle is travelling in a straight line with a speed of travel corresponding to the minimum value of the min./max. window. This applies to forward and to backwards travel.

In a corresponding way, the first signal processing means 42 determines the control signals $v_l$, $v_r$ to be output upon adjustment of the two control levers 36, 37, starting from positions adjusted $s_l$, $s_r$ equally away from the zero line N, in the direction of the zero line N, according to the equations:

$$v_m > \max.: v_l = v_l - (v_m - \max.)$$

$$v_r = v_r - (v_m - \max.)$$

$$v_m = \max.$$

In this case there results straight line travel of the vehicle with a speed of travel corresponding to the maximum value of the min./max. window.

For steering the vehicle through curves without an alteration of the speed of travel it is merely necessary to adjust one of the two control levers 36, 37. In this case the first signal processing means 42 determines the control signals $v_l$, $v_r$ to be output in accordance with the equations:

$$v_l = v_m + kf \times (s_l - s_r) \text{ and}$$

$$v_r = v_m + kf \times (s_r - s_l),$$

kf being the steering factor indicating the strength of the steering effect, normally being equal to 1.

Figure 3:
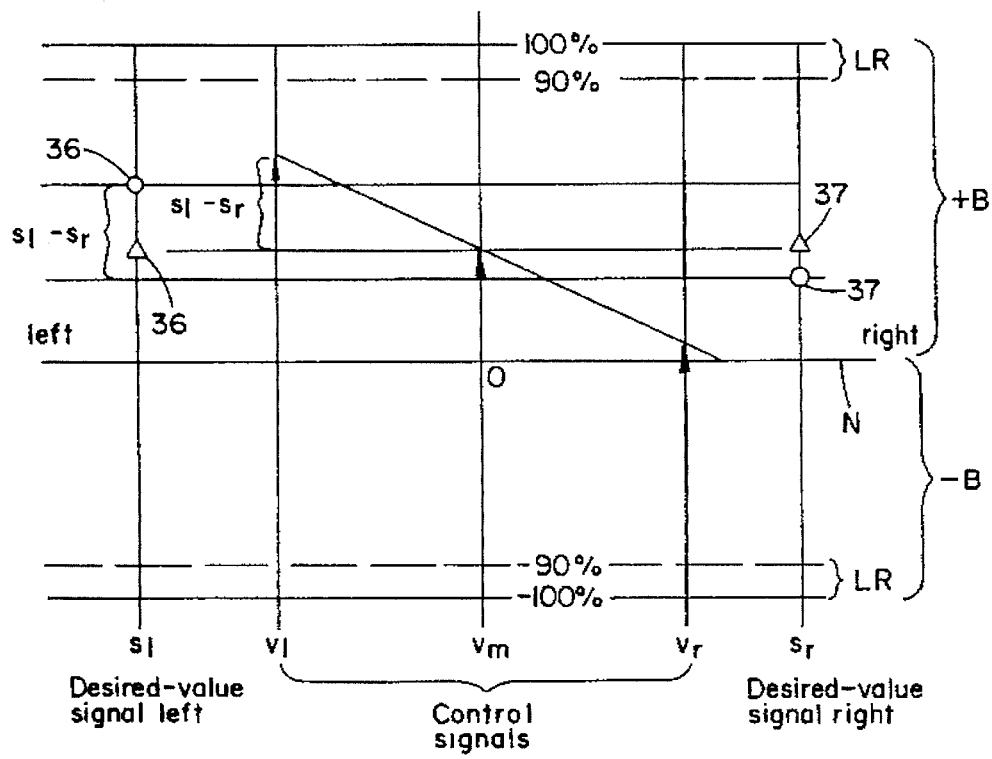

These equations show that the adjustment of merely one of the two control levers 36, 37 effects a change to both the control signals $v_l$, $v_r$ output before the adjustment of the control lever, in each case by the same amount, namely the difference between the desired-value signals $s_l$, $s_r$ in opposite directions generated after the adjustment of the control lever multiplied by the steering factor, and thus effects corresponding steering and maintenance of the speed of travel. An adjustment of the two control levers 36, 37 in opposite directions also effects steering of the vehicle whilst maintaining the speed of travel as is shown in FIG. 3 with reference to an adjustment of the two control levers 36, 37 in opposing directions starting from positions, respectively designated with triangles, at the same distance from the zero line N up to the positions which are marked by respective circles.

FIG. 6 on the other hand shows an alteration (increase) of the driving speed during cornering, while maintaining the control signal difference $\Delta v$, with reference to the adjustment of the two control levers 36, 37 from positions (not shown) which correspond with the signals $v_l$, $v_r$ and $v_m$ indicated by broken lines, into the positions each marked by a circle, over such an adjustment path that the control signal mean value $v_m$ is smaller than the minimum value of the min./max. window which is formed from the desired-value signals $s_l$, $s_r$ generated after the displacement of the control levers 36, 37.

Figure 4:
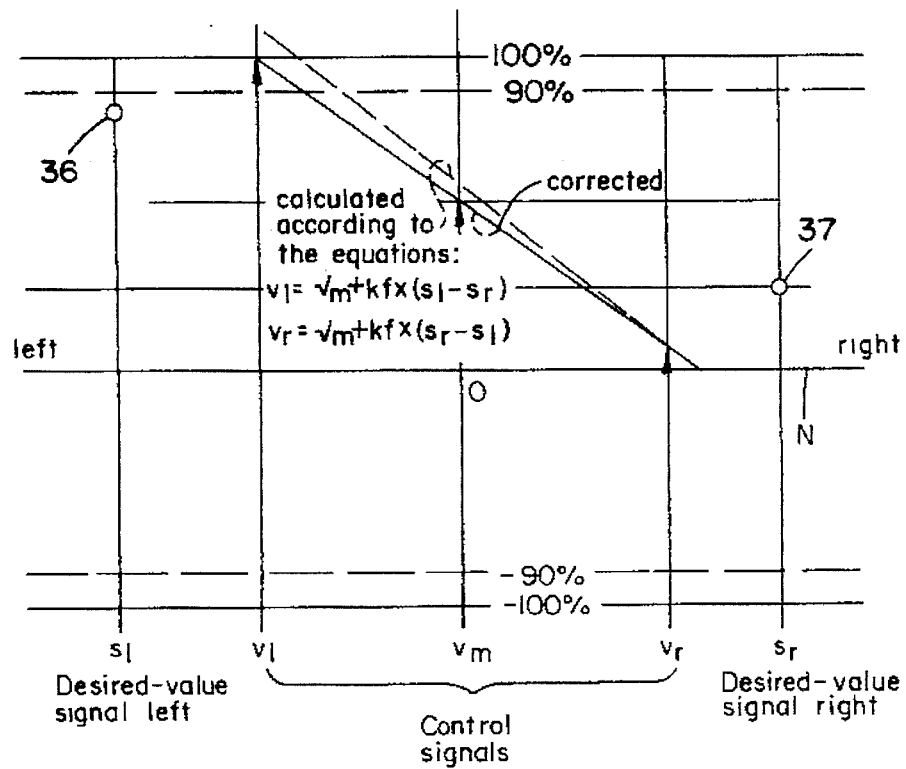

As a result of the calculations effected one of the control signals $v_l$, $v_r$ may exceed a maximum value which corresponds with the maximum value of the desired-value signals $s_l$, $s_r$. In this case it is not possible to maintain the speed of travel. Therefore, in such a case, the first signal processing means 42 reduces both the control signals $v_l$, $v_r$ in the same proportion according to the equations:

$$v_l > 1 : v_r = 1; \quad v_r = v_r \times 1/v_l \text{ and}$$

$$v_r > 1 : v_r = 1; \quad v_l = v_l \times 1/v_r;$$

in this way the predetermined curve radius is maintained (see FIG. 4).

Figure 5:
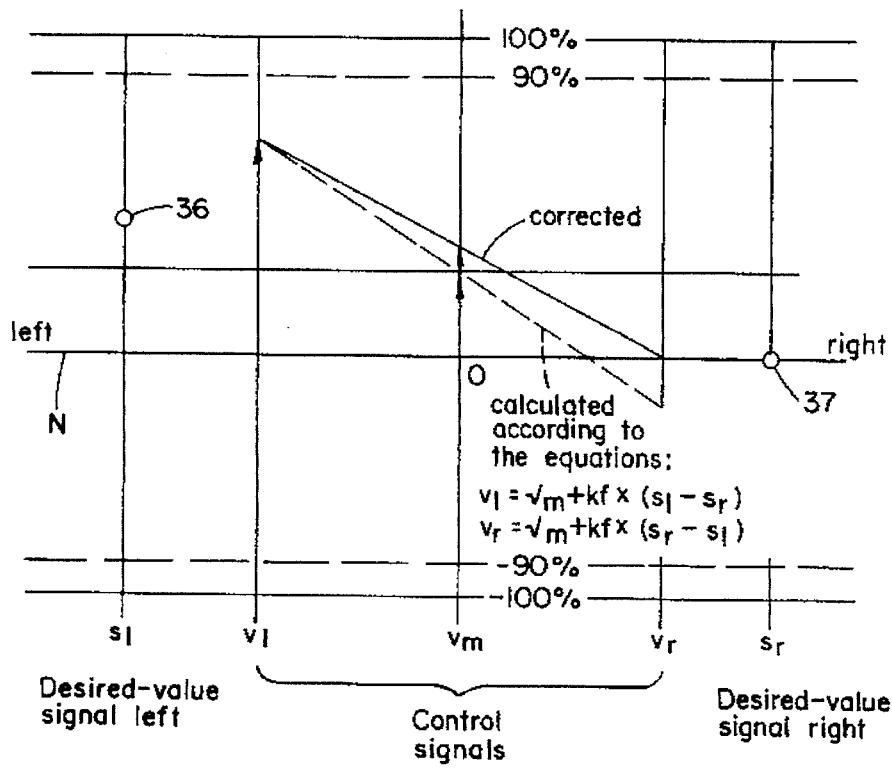

Further a control signal $v_l$ or $v_r$ may result from the above calculations which has a sign different from the corresponding desired-value signal $s_l$ or $s_r$. In this case the corresponding control signal $v_l$ or $v_r$ is set to zero, in accordance with the equations:

$$v_1 \lessgtr 0 \text{ and } s_1 \gtrless 0 : v_1 = 0$$

$$v_r \lessgtr 0 \text{ and } s_r \gtrless 0 : v_r = 0$$

as is shown in FIG. 5.

After carrying out these corrections the first signal processing means 42 determines the control signal difference of $\Delta v$ and the control signal mean value $v_m$ and supplies these signals to the second signal processing means 43.

When cornering, a greater driving moment is required in order to overcome additional frictional forces on the outside of the curve. For this reason, with tight cornering, the hydraulic motors 14, 15 are swung out in the direction of a greater displacement volume, in dependence upon the steering radius. This is performed with the aid of the control logic circuit 50 of the further signal processing means 43 which, when a predetermined value of the control signal difference $\Delta v$ corresponding to a particular curve radius is exceeded, controls the adjustment devices 24, 25 of the two hydraulic motors 14, 15 so that although a reduction of the speed of travel occurs, there is no change to the steering radius.

In case an error occurs in the potentiometers 38, 39 on account of a parting of a cable or a short circuit, the consequence thereof is an undesired steering motion of the vehicle. Also errors in the control of the proportional magnets 26, 27, and 34, 35 of the adjustment devices of the hydraulic motors 14, 15 and hydraulic pumps 12, 13 lead to uncontrolled steering movements of the vehicle. For reasons of safety, the input connections of the potentiometer and the output connections of the proportional magnets are therefore monitored for short circuits and parted cables. In case of a fault, a signal is generated which is further processed in the signal processing means and leads to a reduction of the speed of travel to zero.

The control and regulation device according to the invention can for example also be used for travel drives with a drive motor of constant speed of rotation and/or with hydrostatic transmissions the transmissions ratios of which are adjustable in a first travel range through control of the displacement devices of the hydraulic pumps and in a second travel range, of higher speed of travel, through control of the adjustment devices of the hydraulic motors. Other controls are also possible, as for example the control of the adjustment devices of the hydraulic pumps when travelling in a straight line and of the hydraulic motors when cornering.

We claim:

1. A control and regulation device for a vehicle travel drive, which comprises two hydrostatic transmissions (3, 4), drivable in parallel by at least on drive motor (1), each transmission comprising at least a hydraulic pump (12, 13) and a hydraulic motor (14, 15) and having an adjustable transmission ratio, which are drivingly connected with a right or left wheel or track arrangement (18, 19) of the vehicle, and each transmission having at least one adjustment device (30, 24; 31, 25) controlled by control signals ($v_l$, $v_r$) for adjusting the transmission ratio, and a control section, which comprises a desired-value setting means (5) and a signal processing means (42, 43), wherein the desired-value setting means sets desired-values of the transmission ratio of each of the hydrostatic transmissions, employing respective adjustable control levers (36, 37), and for generating corresponding desired-value signals ($s_l$, $s_r$), and the signal processing means processes the desired-Value signals to form output control signals, characterised by, the signal processing means (42, 43) executes signal processing steps of:

forming a min./max.-window from the desired-value signals ($s_l$, $s_r$) in accordance with the relations $$\text{min.} = \text{minimum}\ (s_l, s_r)$$

$$\text{max.} = \text{maximum}\ (s_l, s_r)$$

wherein in each case the lower value of the desired-value signal ($s_l$ or $s_r$) represents the minimum value of the min./max.-window, and the higher value of the desired-value signal ($s_l$ or $s_r$) represents the maximum value of the min./max.window, and determining control signals ($v_l$, $v_r$) to be outputted in accordance with the equations $$v_l = v_m + (s_l - s_r)$$

$$v_r = v_m + (s_r - s_l),$$

if a mean value $v_m = (v_l + v_r)/2$, corresponding to a speed of travel relative to the longitudinal axis of the vehicle, of the determined control signals ($v_l, v_r$) lies within the min./max. window, or correcting the determined control signals ($v_l, v_r$) of the preceding determining step, for deriving corrected control signals ($v_l, v_r$) to be outputted in accordance with the equations $$v_m < \text{min.}:\ v_l = v_l + (\text{min.} - v_m)$$

$$v_r = v_r + (\text{min.} - v_m)$$

$$v_m = \text{min.}$$

and $$v_m > max.: v_l = v_r - (v_m - max.)$$

$$v_r = v_r - (v_m - max.)$$

$$v_m = max.$$

if the mean value ($v_m$) of the determined control signals ($v_r$) lies outside the min./max. window.

2. A control and regulation device according to claim 1, characterised by, the hydraulic pumps (12, 13) and/or the hydraulic motors (14, 15) of the hydrostatic transmissions (3, 4) are adjustable in their displacement volume and are equipped with the respective adjustment devices (30, 31; 24, 25) controlled by the control signals ($v_l$, $v_r$, $v_m$) outputted by the signal processing means (42, 43) for adjusting their displacement volumes.

3. A control and regulation device according to claim 1, characterised by, the signal processing means (42, 43) calculates the mean value ($v_m$) and a difference ($\Delta V$) of the determined or corrected control signals ($v_l$, $v_r$) and outputs corresponding signals ($v_m$, $\Delta v$).

4. A control and regulation device according to claim 3, characterised by, the signal processing means (43) delays output of the control signal mean value ($v_m$).

5. A control and regulation device in accordance with claim 3 or 4, characterised by, the adjustment devices (24, 25) of the hydraulic motors (14, 15) are controlled by the control signal mean value ($v_m$) output of the signal processing means (43).

6. A control and regulation device according to claim 5, characterised by the signal processing means (43) corrects the control signal mean value (vm) outputted to the adjustment devices (24, 25) of the hydraulic motors (14, 15) to increase the displacement volume of the hydraulic motors (14, 15) when a predetermined value of the control signal difference ($\Delta v$) is exceeded.

7. A control and regulation device according to claim 4, characterised by, the signal processing means (43) provides an undelayed output of the control signal difference ($\Delta v$).

8. A control and regulation device according to claim 7, characterised by, the signal processing means (43) calculates, from contemporaneous values of the delayed control signal mean value ($v_m$) and the undelayed control signal difference ($\Delta v$), corresponding control signals ($v_l$, $v_r$) to control the adjustment devices (30, 31) of the hydraulic pumps (12, 13).

9. A control and regulation device according to claim 1, characterised by, the signal processing means (42) limits the desired-value signals ($s_l$, $s_r$)) in each case to a highest value ($s_l$=0 .. . ~90%; $s_r$=0 . . . ~90%) in the region of approximately 90% of a maximum value of 100% which corresponds to a maximum adjustment movement of the control levers (36, 37).

10. A control and regulation device according to claim 1, characterised by the signal processing means (42) reduces the control signals ($v_1$, $v_r$) in the same proportion, if a maximum value corresponding to a maximum value of the desired-value signals ($s_l$, $s_r$) is exceeded, in accordance with the equations $$v_l > 1: v_l = 1; \; v_r = v_r \times 1/v_l$$

$$v_r > 1: v_r = 1; \; v_l = v_l \times 1/v_r$$

for outputting reduced control signals ($v_l$, $v_r$).

11. A control and regulation device according to claim 1, characterised by, the signal processing means (42) sets one of the two control signals ($v_l$, $v_r$) to a zero value if the corresponding desired-value signal ($s_l$, $s_r$) has a different sign, in accordance with the equations $$v_1 \lessgtr 0 \text{ and } s_1 \gtrless 0: v_1 = 0$$

$$v_r \lessgtr 0 \text{ and } s_r \gtrless 0: v_r = 0, \text{ and}$$

for outputting the raised control signals ($v_1$, $v_r$).

12. A control and regulation device according to claim 1, including a constant running regulation means for maintaining preselected transmission ratios of the hydrostatic transmissions upon the occurrence of external disturbances, characterised by, the constant running regulation means (44) evaluates measured actual values of the transmission ratios or the output drive speeds of rotation ($n_{list}$, $n_{rist}$) of the hysrostatic transmissions (3, 4) in accordance with the equations $$n_l = n_{list} \times v_l / v_l \text{ for right-hand curves}$$

$$n_r = n_{rist} \times v_r / v_r \text{ for left-hand curves}$$

for difference formation in accordance with the equations $$\Delta n_l = n_l \cdot n_{rist} \text{ for right-hand curves}$$

$$\Delta n_r = n_r \cdot n_{list} \text{ for left-hand curves, and}$$

for outputting the control signals ($v_l$, $v_r$) received from the control part after correction thereof with the difference values ($\Delta n_l$, $\Delta n_r$), if the difference values ($\Delta n_l$, $\Delta n_r$) are greater than zero.

13. A control and regulation device according to claim 12, including a limit load regulation means for increasing the transmission ratios of the hydrostatic transmissions upon overloading of the drive motor, characterised by, the limit load regulation means (45) corrects the control signals $v_l$, $v_r$, $v_m$) received from the signal processing means (42, 43) and/or the constant running regulation means (44) to form corrected control signals, and directly controls the adjustment devices (30, 31; 24, 25) of the hydraulic pumps (12, 13) and/or the hydraulic motors (14, 15) with the corrected control signals ($v_l$, $v_r$, $v_m$).

14. A control and regulation device according to claim 13, characterised by a programmable microcontroller (6), which comprises the signal processing means (42, 43) the constant running regulation means (44) and the limit load regulation means (45).

* * * * *